(12) United States Patent
Chou et al.

(10) Patent No.: US 9,602,293 B2
(45) Date of Patent: Mar. 21, 2017

(54) MANAGING IDLE MODE OF OPERATION IN NETWORK SWITCHES

(71) Applicant: Marvell World Trade Ltd., St. Michael (BB)

(72) Inventors: Hong Yu Chou, Saratoga, CA (US); Donald Pannell, Cupertino, CA (US); Weiwen Zhu, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 115 days.

(21) Appl. No.: 14/526,861

(22) Filed: Oct. 29, 2014

(65) Prior Publication Data

US 2015/0124838 A1   May 7, 2015

Related U.S. Application Data

(60) Provisional application No. 61/900,622, filed on Nov. 6, 2013.

(51) Int. Cl.
  *H04L 12/12*  (2006.01)
  *H04L 12/931*  (2013.01)
  (Continued)

(52) U.S. Cl.
  CPC ............. *H04L 12/12* (2013.01); *H04L 12/10* (2013.01); *H04L 41/0833* (2013.01);
  (Continued)

(58) Field of Classification Search
  None
  See application file for complete search history.

(56) References Cited

U.S. PATENT DOCUMENTS 6,463,542 B1  10/2002  Yu et al.
2005/0105545 A1  5/2005  Thousand et al.
(Continued)

FOREIGN PATENT DOCUMENTS

EP   2479925 B1   7/2012

OTHER PUBLICATIONS

Ananthanarayanan, et al., "Greening the Switch", Technical Report No. UCB/EECS-2008-114, Sep. 10, 2008, retrieved from the Internet on Jan. 28, 2015 from http://citeseerx.ist.psu.edu/viewdoc/download?doi=10.1.1.418.1591&rep=rep1&type=pdf.
(Continued)

*Primary Examiner* — Charles C Jiang
*Assistant Examiner* — George Atkins, Jr.

(57) ABSTRACT

Embodiments include a method for operating a network switch that is coupled to a plurality of devices, the method comprising: determining whether the network switch has, for at least a threshold period of time, (i) not received any data packets from the plurality of devices and (ii) not transmitted any data packets to the plurality of devices; in response to determining that the network switch has, for at least the threshold period of time, (i) not received any data packets from the plurality of devices and (ii) not transmitted any data packets to the plurality of devices, entering, by the network switch, a first mode of operation; while the network switch operates in the first mode of operation, monitoring a plurality of signals; and in response to detecting a change in one of the plurality of signals, exiting, by the network switch, the first mode of operation.

23 Claims, 2 Drawing Sheets

(51) Int. Cl.
*H04L 12/26* (2006.01)
*H04L 12/10* (2006.01)
*H04L 12/24* (2006.01)

(52) U.S. Cl.
CPC ...... *H04L 43/0817* (2013.01); *H04L 43/0876* (2013.01); *Y02B 60/32* (2013.01); *Y02B 60/34* (2013.01); *Y02B 60/35* (2013.01)

(56) References Cited

U.S. PATENT DOCUMENTS

| | | | |
|---|---|---|---|
| 2008/0154913 A1* | 6/2008 | Kohonen | H04W 76/045 |
| 2009/0096592 A1* | 4/2009 | Wu | H04B 3/542 |
| | | | 307/66 |
| 2009/0125735 A1* | 5/2009 | Zimmerman | G06F 1/3203 |
| | | | 713/310 |
| 2010/0023658 A1* | 1/2010 | Diab | H04L 12/40039 |
| | | | 710/59 |
| 2011/0191608 A1* | 8/2011 | Vetteth | G06F 1/32 |
| | | | 713/310 |
| 2014/0301258 A1* | 10/2014 | Belghoul | H04W 52/0209 |
| | | | 370/311 |
| 2015/0085687 A1* | 3/2015 | Tabet | H04W 24/08 |
| | | | 370/252 |
| 2015/0319744 A1* | 11/2015 | Jung | H04W 24/10 |
| | | | 370/328 |

OTHER PUBLICATIONS

Chou, et al., "Low-Power Idle based EEE 100Base-TX", IEEE Draft, vol. 802.3az, Mar. 14, 2008, pp. 1-18.

PCT Invitation to Pay Additional Fees mailed Feb. 6, 2015 for PCT application No. PCT/US2014/063225, 9 pages.

IEEE, Part 3: Carrier Sense Multiple Access with Collision Detection (CSMA/CD) Access Method and Physical Layer Specifications, IEEE Computer Society, Amendment to IEEE Std 802.3 2008, Oct. 27, 2010, pp. 1-302.

* cited by examiner

MANAGING IDLE MODE OF OPERATION IN NETWORK SWITCHES

CROSS REFERENCE TO RELATED APPLICATIONS

The present disclosure claims priority to U.S. Provisional Patent Application No. 61/900,622, filed on Nov. 6, 2013, which is incorporated herein by reference in its entirety.

TECHNICAL FIELD

Embodiments of the present disclosure relate to network switches, and in particular to managing an idle mode of operation in network switches.

BACKGROUND

A network switch (e.g., an Ethernet switch) is a computer networking device that is used to connect a plurality of devices together on a computer network, e.g., by performing a form of packet switching. Network switches have become increasingly popular in routing or switching packets in a network.

Network switches are usually powered by the main AC (alternating current) power. Given the huge number of network switches being employed in today's technology driven world, it may be beneficial in the long run to decrease power consumption of network switches.

SUMMARY

In various embodiments, the present disclosure provides a method for operating a network switch that is coupled to a plurality of devices, the method comprising: determining whether the network switch has, for at least a threshold period of time, (i) not received any data packets from the plurality of devices and (ii) not transmitted any data packets to the plurality of devices; in response to determining that the network switch has, for at least the threshold period of time, (i) not received any data packets from the plurality of devices and (ii) not transmitted any data packets to the plurality of devices, entering, by the network switch, a first mode of operation; while the network switch operates in the first mode of operation, monitoring, by the network switch, a plurality of signals; and in response to detecting a change in one of the plurality of signals, exiting, by the network switch, the first mode of operation.

In various embodiments, the present disclosure also provides a network switch coupled to a plurality of devices, the network switch comprising: a monitoring module configured to determine whether the network switch has, for at least a threshold period of time, (i) not received any data packets from the plurality of devices and (ii) not transmitted any data packets to the plurality of devices; a power management module, wherein in response to the monitoring module determining that the network switch has, for at least the threshold period of time, (i) not received any data packets from the plurality of devices and (ii) not transmitted any data packets to the plurality of devices, the power management module is configured to facilitate the network switch to enter a first mode of operation, wherein while the network switch operates in the first mode of operation, the monitoring module is further configured to monitor a plurality of signals, and in response to the monitoring module detecting a change in one of the plurality of signals, the network switch is configured to exit the first mode of operation.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Architecture of an Example Network Switch

Figure 1:
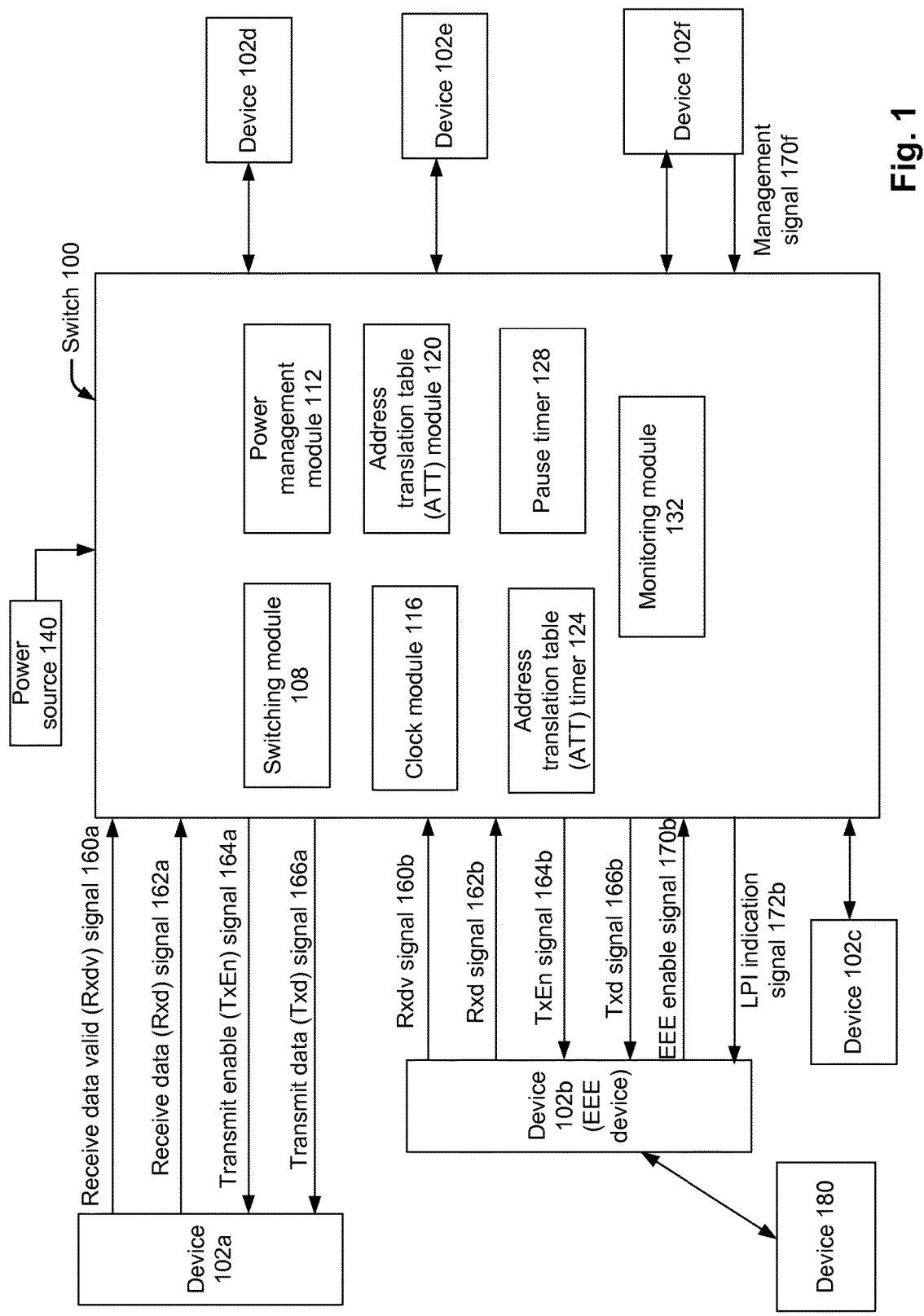
FIG. 1 schematically illustrates a network switch coupled to a plurality of devices.

FIG. 1 schematically illustrates a network switch 100 coupled to a plurality of devices 102a, . . . , 102f. Although the network switch (henceforth referred to as "switch") 100 is illustrated to be coupled to six devices, the network switch 100 may be coupled to any number of devices.

In an example, the switch 100 is an Ethernet switch (e.g., a Gigabit Ethernet switch). In an example, individual ones of the devices 102a, . . . , 102f comprises a network connected device, a physical layer device, a link layer device, a router, a central processing unit (CPU), and/or any appropriate device that may be coupled to a network switch. In an example, the device 102f comprises a CPU or a computing device for configuring the switch 100 and/or managing various operations of the switch 100.

In an embodiment, the switch 100 comprises a switching module 108. In operation, the switch 100 receives streams of data packets (henceforth referred to as "packets") from one or more of the devices 102a, . . . , 102f, and forwards each packet to an appropriate destination (e.g., forwards each packet to a corresponding one of the devices 102a, . . . , 102f). Thus, the switching module 108 performs switching or routing of the packets among the devices 102a, . . . , 102f.

In an embodiment, the switch 100 is powered by power from a power source 140. In an example, the power source 140 is AC mains power. Although not illustrated in FIG. 1, the switch 100, for example, has an internal backup power (e.g., battery operated power), and/or receives backup power from a secondary power source, e.g., in case the power source 140 fails. The switch 100 further comprises a clock module 116 to generate one or more clock signals, for use by various components of the switch 100.

In an embodiment, the switch 100 comprises a power management module 112 configured to manage power supplied to various components of the switch 100. In general, packets may arrive from one or more devices 102 to the switch 100 continuously, or intermittently. For example, there may be brief (or long) intermittent periods during which no packets are being received by the switch 100. As will be discussed in more detail herein later, the power management module 112 facilitates the switch 100 to enter a low power mode or idle mode while no packets are being processed (e.g., received, switched, and/or transmitted) by the switch 100, thereby decreasing an amount of power consumed by the switch 100. As the switch 100 has a relatively high switching speed, the power management module 112 also facilitates the switch 100 from exiting the low power mode with no or minimal latency, when packets arrive at the switch 100 for switching (e.g., thereby ensuring that no packets being received from one of the devices 102 are dropped by the switch 100).

In an embodiment, the switch 100 comprises an address translation table (ATT) module 120. The ATT module 120 is configured to, for example, maintain and map addresses of various devices 102 connected to the switch 100. When a packet arrives at the switch 100, an appropriate destination of the packet is determined based on, for example, information included in the packet and information included in the ATT module 120. The ATT module 120, for example, comprises a table that is stored in a memory (not illustrated in FIG. 1) of the switch 100.

In an embodiment, contents of the ATT module 120 need to be dynamically updated or refreshed. For example, an entry in the ATT module 120 ages out after being included in the ATT module 120 for a predetermined time period. For example, after the entry is entered in the ATT module 120 for the pre-determined time period (e.g., 5 minutes), the entry ages out. At the end of the pre-determined time period, the entry gets deleted from the ATT module 120, or is refreshed (e.g., it is determined that the entry is to be stored for another 5 minutes). That is, at regular intervals, a determination is made as to whether to keep the entry in the ATT module 120, or delete the entry from the ATT module 120. In an embodiment, an address translation table timer (ATT timer) 124 keeps track of time, i.e., keeps track of when individual entries of the ATT module 120 ages out (i.e., keeps track of when individual entries of the ATT module 120 are to be deleted or refreshed).

In an example, the switch 100 transmits a stream of packets to one of the devices 102, e.g., the device 102a. The device 102a may not be capable or fast enough to process, in real time, all the packets received from the switch 100 (e.g., because of a receive buffer of the device 102a, for buffering packets received from the switch 100, having limited storage space, and/or the device 102a having slower processing speed). Accordingly, in an example, the device 102a may request the switch 100 to halt or temporarily pause transmission of packets for some time period. During such a time period, packets destined for the device 102a are stored in a transmit buffer (not illustrated in FIG. 1) of the switch 100. At an end of the time period (e.g., once the device 102a processes at least some of the packets it previously received from the switch 100), the switch 100 resumes transmission of packets to the device 102a. In an embodiment, the switch 100 comprises a pause timer 128 configured to keep track of a time period for which transmission of packets to the device 102a (or to any other device 102) is to be paused or halted.

In an embodiment, the switch 100 comprises a monitoring module 132 configured to monitor various activities of the switch 100. The monitoring module 132, for example, monitors various activities of the switch 100, selectively instructs the power management module 112 to enable the switch 100 to enter a low power or idle mode, and selectively instructs the power management module 112 to enable the switch 100 to exit the low power or idle mode, as will be discussed in more detail herein later.

Although the switch 100 generally includes several other components (e.g., a processor, a memory, various input/output ports, interfaces, etc.), these components are generally known and thus not discussed herein for purposes of simplicity and clarity.

FIG. 1 illustrates example signals communicated between the device 102a and the switch 100. In an embodiment, the device 102a selectively transmits a receive data valid (Rxdv) signal 160a, and a receive data (Rxd) signal 162a to the switch 100; and the device 102a selectively receives a transmit enable (TxEn) signal 164a, and a transmit data (Txd) signal 166a from the switch 100. Transmission of similar signals (e.g., Rxdv signal 160b, Rxd signal 162b, TxEn signal 164b, and Txd signal 166b) between the device 102b and the switch 100 is also illustrated in FIG. 1. Although the switch 100 also communicates similar signals with one or more of the devices 102c, . . . , 102f, such signals are not illustrated in FIG. 1 for purposes of illustrative clarity.

In an embodiment, when the device 102a desires to transmit packets to the switch 100 (e.g., so that the switch 100 can switch the packets to one or more of the other devices), the device 102a provides an indication of transmission of the packets via the Rxdv signal 160a. For example, a toggling of the Rxdv signal 160a (e.g., a change of state of the Rxdv signal 160a from low to high) indicates that packets are now to be transmitted from the device 102a to the switch 100. The actual packets are transmitted from the device 102a to the switch 100 via the Rxd signal 162a. Subsequent to an end of transmission of the packets from the device 102a to the switch 100, the Rxdv signal 160a toggles back from (e.g., a change of state of the Rxdv signal 160a from high to low).

In an embodiment, when the switch 100 desires to transmit packets to the device 102a, the switch 100 provides an indication of transmission of the packets via the TxEn signal 164a. For example, a toggling of the TxEn signal 164a (e.g., a change of state of the TxEn signal 164a from low to high) indicates that packets are now to be transmitted from the switch 100 to the device 102a. The actual packets are transmitted from the switch 100 to the device 102a via the Txd signal 166a. Subsequent to an end of transmission of the packets from the switch 100 to the device 102a, the TxEn signal 164a toggles back from (e.g., a change of state from high to low).

As previously discussed, in an example, the device 102f comprises a computing device (e.g., a CPU) configured to manage various operations of the switch 100. In an embodiment, in addition to communicating the corresponding Rxdv signal, the Rxd signal, the TxEn signal, and the Txd signal, the device 102f also selectively transmits management signal 170f to the switch 100. The management signal 170f, for example, is to manage various operations and/or configurations of the switch 100. For example, a user can configure the switch 100, via the device 102f, using the management signal 170f. In an example, the management signal 170f comprises Management Data Input/Output (MDIO) signal and/or Management Data (MD) clock signal.

In an embodiment, one or more devices 102 of FIG. 1 may adhere to the Institute of Electrical and Electronics Engineers (IEEE) 802.3az standard. These devices are, for example, Energy-Efficient Ethernet (EEE) compliant devices (henceforth referred to as "EEE devices"), adhering to the IEEE 802.3az standard, thereby allowing for less power consumption during periods of low data activity. In the example of FIG. 1, the device 102b is an EEE device. In an embodiment, the device 102b communicates with another EEE compliant device 180.

In an embodiment, pursuant to the IEEE 802.3az standard, the EEE device 102b negotiates with the EEE device 180 to enter in a low power mode. For example, while the EEE devices 102b and 180 are idle (e.g., not processing data packets), the device 102*b* and the EEE device 180 negotiate, pursuant to the IEEE 802.3az standard, and enter the low power mode. While the device 102*b* and the EEE device 180 enter the low power mode, in accordance with the IEEE 802.3az standard, the device 102*b* transmits an EEE enable signal 170*b* to the switch 100. For example, a change of state of the EEE enable signal 170*b* indicates, to the switch 100, that the device 102*b* (and also the EEE device 180) has entered a low power mode, in accordance with the IEEE 802.3az standard.

As previously discussed, each of the devices 102*a*, . . . , 102*f* communicates corresponding Rxdv signal, Rxd signal, TxEn signal, and Txd signal with the switch 100. In addition, the device 102*b*, being an EEE device, transmits the EEE enable signal 170*b* to the switch 100, and receives a low-power-idle (LPI) indication signal 172*b* from the switch 100. The switch 100 transmits the LPI indication signal 172*b*, to indicate or inform the device 102*b* that the switch 100 has entered the idle mode. In an embodiment, the device 102*b* utilizes the LPI indication signal 172*b* from the switch 100, to negotiate and enter the low power mode, in accordance with the IEEE 802.3az standard.

Although FIG. 1 illustrates the device 102*b* and EEE device 180 to be EEE devices, any other device (for example, one or more of devices 102*a*, 102*c*, . . . , 102*f*) illustrated in FIG. 1 can also be an EEE device, adhering to the IEEE 802.3az standard. In an embodiment, the switch 100 communicates a corresponding EEE enable signal and a corresponding LPI indication signal to each EEE device coupled to the switch 100.

Entering an Idle Mode

In an embodiment, the switch 100 enters a low power or idle mode, for example, when the switch 100 is not receiving from, processing and/or transmitting data packets to the devices 102*a*, . . . , 102*f*. In an example, the power management module 112 facilitates such entrance to the idle mode. In the idle mode, one or more components (but not all) of the switch 100 are powered down (e.g., shut off), thereby resulting in a low power consumption of the switch 100.

In an embodiment, the switch 100 can enter the idle mode after the switch 100 has been fully initialized and operational (e.g., after the switch has been switched on from an off state); a physical layer (PHY) polling unit initialization phase has been completed; and various transmit queues of the switch 100 (e.g., queues that queue packets for transmission from the switch 100 to one or more devices 102) are empty (e.g., the TxEn signals transmitted by the switch 100 to various devices are not asserted, indicating that no packets are being transmitted by the switch 100 to the devices 102).

In an embodiment, the switch 100 can enter the idle mode when the switch 100 is not receiving any new packets from any of the devices 102; and an ingress pipeline (e.g., configured to store and process various incoming packets to the switch 100) has processed all incoming packets. For example, whenever new packets arrive from a device 102 (e.g., device 102*a*), the corresponding Rxdv signal (e.g., Rxdv signal 160*a*) indicates arrival of such data packets. In an embodiment, the switch 100 can enter the idle mode when the Rxdv signals received from the devices 102*a*, . . . , 102*f* indicates non-transmission of data packets from these devices 102.

As previously discussed, one or more of the devices 102 (e.g., device 102*b*) coupled to the switch 100 may be an EEE device. If the switch 100 is coupled to an EEE device, the switch 100 can enter the idle mode when the corresponding EEE device also enters a low power mode (e.g., in accordance with the IEEE 802.3az standard). For example, the switch 100 monitors the EEE enable signal 170*b*. Based on monitoring the EEE enable signal 170*b*, once the switch determines that the device 102*b* has entered the low power mode, the switch 100 can enter the idle mode.

As previously discussed, the device 102*f* periodically transmits management signal 170*f*. In an embodiment, the switch 100 can enter the idle mode when the device 102*f* is not transmitting any management and/or configuration information via the management signal 170*f*.

In an embodiment, individual components of the switch 100 have a corresponding flag that indicates whether the corresponding component is busy (e.g., performing an operation). For example, a virtual address translation table (not illustrated in FIG. 1) included the switch 100 has a corresponding flag that indicates when the virtual address translation table is busy (e.g., when the virtual address translation table is being updated, or is otherwise used to access information stored in the virtual address translation table). The ATT module 120 similarly has a corresponding flag that indicates whether the ATT module 120 is busy. In another example, a management information base (MIB) module (not illustrated in FIG. 1) included in the switch 100 has a corresponding flag that indicates when the MIB module is busy. In another example, an ingress rate limiting (IRL) module (not illustrated in FIG. 1) included in the switch 100 has a corresponding flag that indicates when the IRL module is busy. In another example, one or more interfaces (not illustrated in FIG. 1) included in the switch 100 has corresponding flags that indicates when the interface is busy. In an embodiment, the switch 100 can enter the idle mode if the flags associated with various components of the switch 100 indicate that these components are not busy (e.g., not performing a corresponding operation).

Thus, as discussed, in an embodiment, the switch 100 enters a low power or idle mode, for example, (i) after the switch 100 has been fully initialized and operational (e.g., after the switch has been switched on from an off state); (ii) a physical layer (PHY) polling unit initialization phase has been completed; (iii) various transmit queues of the switch 100 (e.g., queues that queue packets for transmission from the switch 100 to one or more devices 102) are empty; (iv) when the switch 100 is not receiving any new packets from any of the devices 102; (v) an ingress pipeline has processed all incoming packets (and/or an egress pipeline has completed sending out packets queued in the egress pipeline); (vi) when the switch 100 is not receiving any management and/or configuration information via the management signal 170*f*; (vii) if the flags associated with various components of the switch 100 indicate that these components are not busy; (viii) any EEE device coupled to the switch 100 has entered a low power mode (e.g., in accordance with the IEEE 802.3az standard), as indicated by a corresponding EEE enable signal received by the switch 100 from the corresponding EEE device, and/or various other conditions are fulfilled. In an embodiment, if one or more (e.g., all) of these conditions are fulfilled for at least a threshold period of time, the switch 100 enters the idle mode.

Operating in the Idle Mode and Exiting the Idle Mode

While the switch 100 is in the idle mode, various components of the switch 100 are turned off, or are operated in a low power mode, while various other components of the switch 100 are not powered down. For example, the clock module 116 generates one or more clock signals. In an embodiment, while the switch 100 is in the idle mode, the clock module 116 stops generating a first one or more clock signals, but continues generating a second one or more clock signals in order to continue operating various essential components of the switch 100. Thus, in such an embodiment, a part of the clock module 116 is powered down. For example, while the switch 100 operates in the idle mode, the clock module 116 stops generating a system clock signal, a memory clock signal (e.g., which is supplied to a memory of the switch 100), one or more clock signals supplied to one or more interfaces of the switch 100, and/or the like.

In an embodiment, while the switch 100 is operating in the idle mode, the monitoring module 132 monitors the Rxdv signals (e.g., Rxdv signal 160a) received from various devices 102 (e.g., device 102a). The monitoring module 132 monitors the Rxdv signals to determine if a device 102 is to transmit packets to the switch 100. Based on monitoring the Rxdv signals, if the monitoring module 132 determines that a device 102 is transmitting packets to the switch 100, the switch 100 exits the idle mode, and enters the regular power mode. In an embodiment, while the switch 100 is operating in the idle mode, the clock module 116 continues generating one or more clock signals used by the monitoring module 132 to monitor the Rxdv signals from the devices 102a, . . . , 102f.

In an embodiment, for the EEE device 102b, instead of monitoring the Rxdv signal 160b, the switch 100 (e.g., the monitoring module 132) monitors the EEE enable signal 170b. For example, when the device 102b is not transmitting any packet to the switch 100 (and also receiving any packet from the switch 100), the device 102b may negotiate with the EEE device 180 to enter a low power mode (e.g., in accordance with the IEEE 802.3az standard). The device 102b indicates such entrance of the low power mode via the EEE enable signal 170b. Whenever the device 102b is to transmit a packet to the switch 100, the device 102b has to exit the low power mode. Such an exit from the low power mode will be indicated by the EEE enable signal 170b. Accordingly, in an embodiment, while the switch 100 operates in the idle mode, instead of (or in addition to) monitoring the Rxdv signal 160b, the switch 100 monitors the EEE enable signal 170b to determine when the device 102b sends a packet to the switch 100. In response to monitoring the EEE enable signal 170b and in response to the EEE enable signal 170b indicating that the device 102b has exited the low power mode, the switch 100 also exits the idle mode, anticipating arrival of packets from the device 102b. In an embodiment, while the switch 100 is operating in the idle mode, the clock module 116 continues generating one or more clock signals used by the monitoring module 132 to monitor EEE enable signals from one or more EEE devices (e.g., from EEE device 102b).

As previously discussed, the ATT timer 124 keeps track of time, i.e., keeps track of when individual entries of the ATT module 120 ages out (i.e., keeps track of when individual entries of the ATT module 120 are to be deleted or refreshed). In an embodiment, while the switch 100 is operating in the idle mode, the ATT module 120 enters a low power mode (e.g., does not consume any power, or is powered down). In an embodiment, while the switch 100 is operating in the idle mode, the ATT timer 124 is operational (e.g., continues keeping track of time, and keeping track of when individual entries of the ATT module 120 are to be deleted or refreshed). For example, while the switch 100 is operating in the idle mode, the clock module 116 continues generating a clock signal used by the ATT timer 124, to keep track of time.

In an embodiment, when an entry of the ATT module 120 is to be deleted (e.g., while the switch 100 is operating in the idle mode), the switch 120 briefly exits from the idle mode (e.g., enters the regular power mode) to update the ATT table (e.g., delete the entry from the ATT table in the ATT module 120), and re-enters the idle mode upon updating the ATT table in the ATT module 120.

As previously discussed, the switch 100 also receives management signals from one or more connected devices 102. In the example of FIG. 1, the switch 100 receives the management signal 170f from device 102f. The management signal 170f, for example, facilitates management of various operations and/or configurations of the switch 100. For example, a user can configure the switch 100, via the device 102f, using the management signal 170f. In an example, the management signal 170f comprises Management Data Input/Output (MDIO) signal and/or Management Data (MD) clock signal. In an embodiment, while the switch 100 is in the idle mode, the switch 100 (e.g., the monitoring module 132) continues monitoring the management signal 170f. In response to the device 102f transmitting information via the management signal 170f to the switch 100, the switch 100 exits the idle mode, and enters the regular power mode (e.g., to respond to, and appropriately process, the information included in the management signal 170f). In an embodiment, while the switch 100 is operating in the idle mode, the clock module 116 continues generating one or more clock signals used by the monitoring module 132 to monitor the management signal 170f.

As previously discussed, in an embodiment, the switch 100 comprises the pause timer 128 configured to keep track of a time period for which transmission to a connected device 102 (e.g., device 102a) is to be paused or halted. In an embodiment, while the switch 100 operates in the idle mode, the pause timer 128 continues to operate, and continues to keep track of the time period for which transmission to the connected device 102 is to be paused or halted. In response to an expiration of the time in the pause timer 128, the switch 100 exits the idle mode, and transmits the packets to the connected device 102. In an embodiment, while the switch 100 is operating in the idle mode, the clock module 116 continues generating one or more clock signals used by the pause timer 128.

In an embodiment, the switch 100 periodically performs a polling of the devices 102 (e.g., devices 102a, . . . , 102f) that are connected to the switch 100. While polling a device 102, the switch 100, for example, checks various parameters associated with the corresponding device. For example, the switch 100 polls a device 102 to determine a speed with which the device 102 communicates with the switch 100, a type of link connecting the device 102 and the switch 100, and/or the like. In another example, while polling the devices 102, the switch 100 can also discover any device 102 that is newly connected to the switch 100 (or discover that a device 102, which was previously connected to the switch 100, is newly disconnected from the switch 100). In an embodiment, the switch 100 periodically polls the connected devices 102, even while the switch 100 is in the idle mode. In an embodiment, while the switch 100 is in the idle mode and if the switch 100 determines any change in one or more devices 102 (e.g., determines that a speed of a device has changed, a new device is now connected to the switch 100, and/or the like) based on polling the devices 102, the switch 100 exist the idle mode, and enters the regular power mode (e.g., in order to process the information associated with the change in the devices 102).

Figure 2:
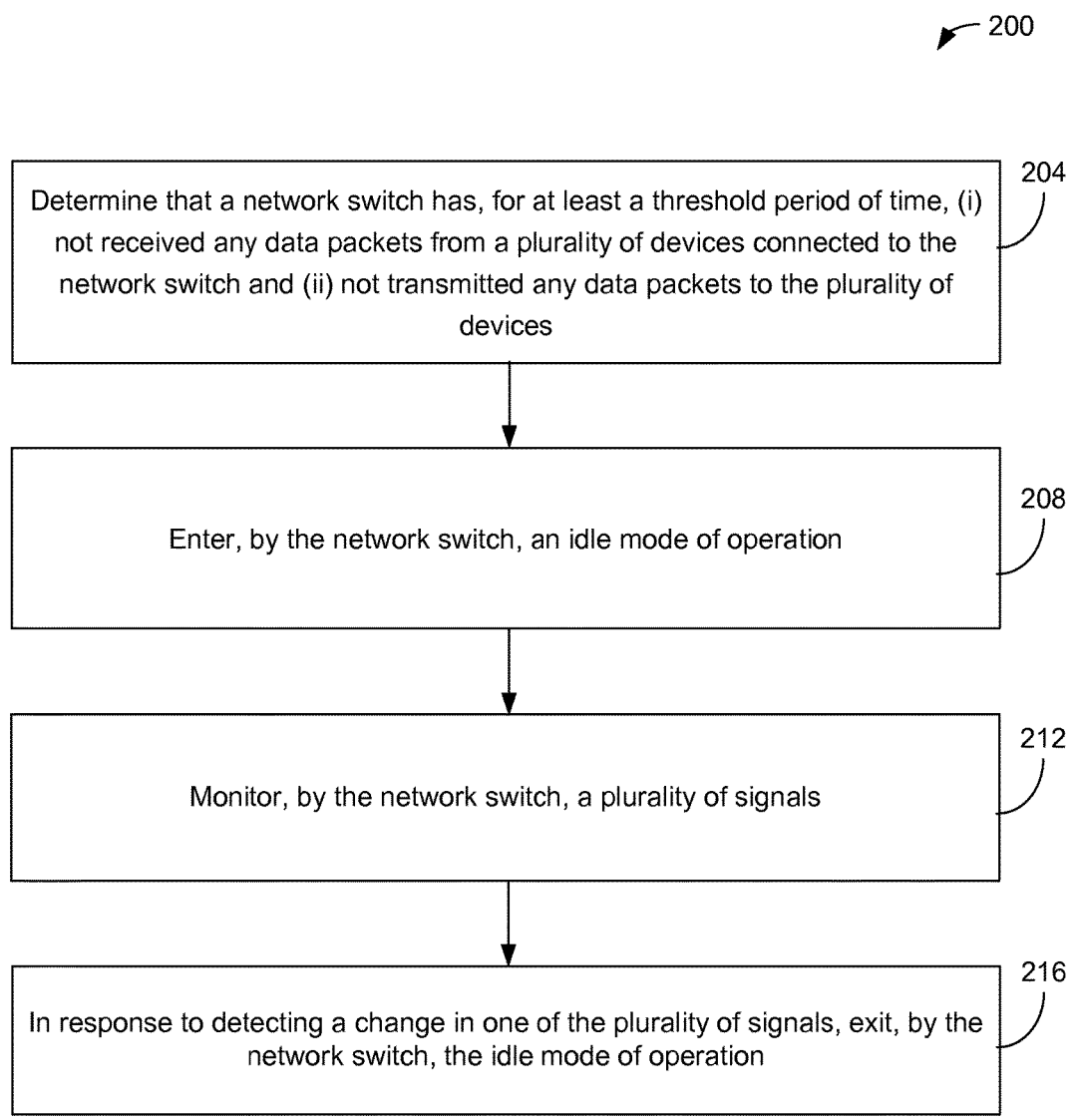
FIG. 2 is a flow diagram of a method to operate a network switch.

FIG. 2 is a flow diagram of a method 200 to operate a network switch (e.g., the switch 100 of FIG. 1). At 204, the network switch (e.g., the monitoring module 132 of FIG. 1) determines that the network switch has, for at least a threshold period of time, (i) not received any data packets from a plurality of devices (e.g., devices 102a, . . . , 102f) connected to the network switch and (ii) not transmitted any data packets to the plurality of devices. At 208, in response to determining that the network switch has, for at least the threshold period of time, (i) not received any data packets from the plurality of devices and (ii) not transmitted any data packets to the plurality of devices, the network switch enters an idle mode of operation.

At 212, while the network switch operates in the idle mode of operation, the network switch (e.g., the monitoring module 132) monitors a plurality of signals. In an embodiment, the plurality of signals comprises (i) a first subset of the plurality of signals (e.g., the Rxdv signals, the EEE enable signals, the management signal 170f, and/or the like) that are generated by one or more of the plurality of devices, and (ii) a second subset of the plurality of signals (e.g., signals generated by the ATT timer 124, pause timer 128, and/or the like) that are generated internally by the network switch. At 216, in response to detecting a change in one of the plurality of signals, the network switch exits the idle mode of operation.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method for operating a network switch that is coupled to a plurality of devices, the method comprising:
   determining whether the network switch has, for at least a threshold period of time, (i) not received any data packets from the plurality of devices and (ii) not transmitted any data packets to the plurality of devices, wherein the network switch is configured to receive, from a first device of the plurality of devices, (i) data packets over a first signal line and (ii) a first signal over a second signal line, wherein the first signal is in a first state whenever any data packet is to be received over the first signal line, and wherein the first signal is in a second state whenever no data packet is to be received over the first signal line;
   generating a first flag that indicates a status of a virtual address translation table included in the network switch, wherein the first flag provides a first indication when the virtual address translation table is not being updated and is not otherwise used to access information stored in the virtual address translation table;
   in response to (i) determining that the network switch has, for at least the threshold period of time, not received any data packets from the plurality of devices and not transmitted any data packets to the plurality of devices and (ii) the first flag providing the first indication, entering, by the network switch, a first mode of operation;
   while the network switch operates in the first mode of operation, monitoring, by the network switch, a plurality of signals including the first signal received over the second signal line, without monitoring reception of data packets over the first signal line; and
   in response to detecting a change in one of the plurality of signals, exiting, by the network switch, the first mode of operation.

2. The method of claim 1, wherein the plurality of signals comprises (i) a first subset of the plurality of signals that are generated by one or more of the plurality of devices, and (ii) a second subset of the plurality of signals that are generated internally by the network switch.

3. The method of claim 1, wherein:
   monitoring the plurality of signals comprises
   monitoring whether the first signal indicates that the first device is to transmit data packets to the network switch; and
   exiting the first mode of operation further comprises
   in response to detecting that the first signal indicates that the first device is to transmit data packets to the network switch, exiting, by the network switch, the first mode of operation.

4. The method of claim 1, wherein the first signal is a receive data valid (Rxdv) signal.

5. The method of claim 1, wherein:
   the plurality of devices comprises a first device;
   the first device is an Energy Efficient Ethernet (EEE) compliant device;
   the plurality of signals comprises an EEE enable signal received by the network switch from the first device;
   the EEE enable signal indicates whether the first device operates in a low power mode;
   monitoring the plurality of signals comprises
   while the network switch operates in the first mode of operation, monitoring the EEE enable signal from the first device; and
   exiting the first mode of operation further comprises
   in response to detecting that the EEE enable signal indicates that the first device is to exit from the low power mode, exiting, by the network switch, the first mode of operation.

6. The method of claim 5, further comprising:
   while the network switch operates in a regular power mode of operation, monitoring the EEE enable signal from the first device; and
   in response to monitoring the EEE enable signal from the first device, determining that that the first device is operating in the low power mode for at least the threshold period of time,
   wherein entering, by the network switch, the first mode of operation further comprises
   in response to determining that that the first device is operating in the low power mode for at least the threshold period of time, entering, by the network switch, the first mode of operation.

7. The method of claim 1, wherein:
the network switch comprises (i) an address translation table (ATT) module configured to maintain and map addresses of various devices connected to the network switch and (ii) an address translation table timer (ATT timer) configured to keep track of aging of an entry of the ATT module; and
the method further comprises
while the network switch operates in the first mode of operation,
(i) powering down the ATT module, and
(ii) refraining from powering down the ATT timer.

8. The method of claim 7, wherein:
monitoring, by the network switch, the plurality of signals further comprises
monitoring a second signal from the ATT timer, wherein the second signal is configured to provide an indication when the entry of the ATT module ages out; and
exiting, by the network switch, the first mode of operation further comprises
based on monitoring the second signal from the ATT timer, determining that the entry of the ATT module has aged out, and
based on determining that the entry of the ATT module has aged out, exiting, by the network switch, the first mode of operation.

9. The method of claim 1, wherein:
the network switch comprises a pause timer configured to keep track of a time period for which transmission of data packets from the network switch to a first device of the plurality of devices has been paused;
the method further comprises
while the network switch operates in the first mode of operation, refraining from powering down the pause timer;
monitoring, by the network switch, the plurality of signals further comprises
monitoring a second signal from the pause timer, wherein the second signal is configured to provide an indication of an end of the timer period for which of transmission of data packets from the network switch to the first device has been paused; and
exiting, by the network switch, the first mode of operation further comprises
based on monitoring the second signal from the pause timer, determining the end of the timer period for which of transmission of data packets from the network switch to the first device has been paused, and
based on determining the end of the time period, exiting, by the network switch, the first mode of operation.

10. The method of claim 1, wherein the first mode of operation is a low power mode of operation.

11. A network switch coupled to a plurality of devices, the network switch comprising:
an input/output interface configured to transmit and receive data packets;
a monitoring module configured to determine whether the network switch has, for at least a threshold period of time, (i) not received any data packets from the plurality of devices and (ii) not transmitted any data packets to the plurality of devices, wherein the network switch is configured to receive, from a first device of the plurality of devices, (i) data packets over a first signal line and (ii) a first signal over a second signal line, wherein the first signal is in a first state whenever any data packet is to be received over the first signal line, and wherein the first signal is in a second state whenever no data packet is to be received over the first signal line;
a power management module,
wherein in response to the monitoring module determining that the network switch has, for at least the threshold period of time, (i) not received any data packets from the plurality of devices and (ii) not transmitted any data packets to the plurality of devices, the power management module is configured to facilitate the network switch to enter a first mode of operation,
wherein while the network switch operates in the first mode of operation, the monitoring module is further configured to monitor a plurality of signals including the first signal received over the second signal line, without monitoring reception of data packets over the first signal line,
wherein while the network switch operates in the first mode of operation, the network switch is configured to poll multiple devices connected to the network switch to check one or more of (i) if any new device has been connected to the network switch and (ii) if any previously connected device has been disconnected from the network switch, and
in response to the monitoring module detecting a change in one of the plurality of signals, the network switch is configured to exit the first mode of operation.

12. The network switch of claim 11, wherein the plurality of signals comprises (i) a first subset of the plurality of signals that are generated by one or more of the plurality of devices, and (ii) a second subset of the plurality of signals that are generated internally by the network switch.

13. The network switch of claim 11, wherein:
the monitoring module is further configured to monitor the plurality of signals by
monitoring whether the first signal indicates that the first device is to transmit data packets to the network switch; and
the network switch is configured to exit the first mode of operation by
in response to detecting that the first signal indicates that the first device is to transmit data packets to the network switch, exiting the first mode of operation.

14. The network switch of claim 11, wherein the first signal is a receive data valid (Rxdv) signal.

15. The network switch of claim 11, wherein:
the plurality of devices comprises a first device;
the first device is an Energy Efficient Ethernet (EEE) compliant device;
the plurality of signals comprises an EEE enable signal received by the network switch from the first device;
the EEE enable signal indicates whether the first device is operating in a low power mode;
the monitoring module is further configured to monitor the EEE enable signal from the first device; and
in response to the EEE enable signal indicating that the first device is to exit from the low power mode, the network switch is configured to exit the first mode of operation.

16. The network switch of claim 15, wherein:
while the network switch operates in a regular power mode of operation, the monitoring module is further configured to (i) monitor the EEE enable signal from the first device, and (ii) determine that that the first device is in the low power mode for at least the threshold period of time; and the network switch is further configured to enter the first mode of operation by
in response to the determination that that the first device is in the low power mode for at least the threshold period of time, entering the first mode of operation.

17. The network switch of claim 11, wherein:

the network switch further comprises (i) an address translation table (ATT) module configured to maintain and map addresses of various devices connected to the network switch and (ii) an address translation table timer (ATT timer) configured to keep track of aging of an entry of the ATT module; and while the network switch operates in the first mode of operation, the network switch is further configured to (i) power down the ATT module, and (ii) refrain from powering down the ATT timer.

18. The network switch of claim 17, wherein:

the monitoring module is further configured to monitor the plurality of signals by
monitoring a second signal from the ATT timer, wherein the second signal is configured to provide an indication when the entry of the ATT module ages out, and
based on monitoring the second signal from the ATT timer, determining that the entry of the ATT module has aged out; and the network switch is further configured to exit the first mode of operation based on the determination that the entry of the ATT module has aged out.

19. The network switch of claim 11, wherein:

the network switch further comprises a pause timer configured to keep track of a time period for which transmission of data packets from the network switch to a first device of the plurality of devices has been paused;

while the network switch operates in the first mode of operation, the network switch is configured to refrain from powering down the pause timer;

the monitoring module is further configured to monitor the plurality of signals by
monitoring a second signal from the pause timer, wherein the second signal is configured to provide an indication of an end of the timer period for which of transmission of data packets from the network switch to the first device has been paused; and the network switch is further configured to exit the first mode of operation by
based on the second signal from the pause timer being monitored, determining the end of the timer period for which of transmission of data packets from the network switch to the first device has been paused, and
based on determining the end of the time period, exiting the first mode of operation.

20. The network switch of claim 11, wherein the network switch is an Ethernet switch.

21. A method for operating a network switch that is coupled to a plurality of devices, the method comprising:

determining whether the network switch has, for at least a threshold period of time, (i) not received any data packets from the plurality of devices and (ii) not transmitted any data packets to the plurality of devices;

generating a first flag that indicates a status of a virtual address translation table included in the network switch, wherein the first flag provides a first indication when the virtual address translation table is not being updated and is not otherwise used to access information stored in the virtual address translation table;

generating a second flag that indicates a status of an address translation table (ATT) module configured to maintain and map addresses of various devices connected to the network switch, wherein the second flag provides a second indication when the ATT module is not being updated and is not otherwise used to access information stored in the ATT module;

generating a third flag that indicates a status of a management information base (MIB) module included in the network switch, wherein the third flag provides a third indication when the MIB module is not busy; and generating a fourth flag that indicates a status of an ingress rate limiting (IRL) module configured to control a rate of ingress transmission in the network switch, wherein the fourth flag provides a fourth indication when the IRL module is not busy, in response to (i) the first flag providing the first indication, (ii) the second flag providing the second indication, (iii) the third flag providing the third indication, (iv) the fourth flag providing the fourth indication, and (v) determining that the network switch has, for at least the threshold period of time, not received any data packets from the plurality of devices and not transmitted any data packets to the plurality of devices, entering, by the network switch, a first mode of operation;

while the network switch operates in the first mode of operation, monitoring, by the network switch, a plurality of signals; and in response to detecting a change in one of the plurality of signals, exiting, by the network switch, the first mode of operation.

22. The method of claim 1, further comprising:

while the network switch operates in the first mode of operation, polling, by the network switch, multiple devices connected to the network switch to check one or more of (i) one or more parameters of one or more of the multiple devices, (ii) if any new device has been connected to the network switch, and (iii) if any previously connected device has been disconnected from the network switch.

23. The method of claim 22, further comprising:

while the network switch operates in the first mode of operation, refraining from powering down one or more components that are associated with conducting the polling.

* * * * *